United States Patent
Asakura

(10) Patent No.: US 10,051,155 B2
(45) Date of Patent: Aug. 14, 2018

(54) COMMUNICATION DEVICE CAPABLE OF EXECUTING AUTHENTICATION OF TARGET DEVICE

(71) Applicant: BROTHER KOGYO KABUSHIKI KAISHA, Nagoya-shi, Aichi-ken (JP)

(72) Inventor: Hirotaka Asakura, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/471,363

(22) Filed: Mar. 28, 2017

(65) Prior Publication Data

US 2017/0289402 A1 Oct. 5, 2017

(30) Foreign Application Priority Data

Mar. 31, 2016 (JP) ................................. 2016-071818

(51) Int. Cl.
*H04N 1/44* (2006.01)
*H04W 12/06* (2009.01)
(Continued)

(52) U.S. Cl.
CPC ....... *H04N 1/4433* (2013.01); *H04L 63/0853* (2013.01); *H04W 4/80* (2018.02);
(Continued)

(58) Field of Classification Search
CPC .................................................. H04N 1/4433
(Continued)

(56) References Cited

U.S. PATENT DOCUMENTS

2014/0168687 A1 6/2014 Kim et al.
2015/0029532 A1* 1/2015 Lee ........................ G06F 3/1238
358/1.14
(Continued)

FOREIGN PATENT DOCUMENTS

JP 2010-198505 A 9/2010
JP 2015-069458 A 4/2015

OTHER PUBLICATIONS

2010 Wi-Fi Alliance, Wi-Fi Peer-to-Peer (P2P) Technical Specification Version 1.1.

*Primary Examiner* — Jacky X Zheng
(74) *Attorney, Agent, or Firm* — Scully, Scott, Murphy & Presser, P.C.

(57) ABSTRACT

A communication device may receive any one signal among two or more types of signals from a target device, receive format information from the target device, receive a specific signal including information described in the predetermined format from the target device in a case where the format information indicates that the target device supports the predetermined format, determine whether or not related information related to a predetermined application software is included in the specific signal, and execute an authentication of the target device by using first identification information included in the specific signal in a case where it is determined that the related information is included in the specific signal, wherein the authentication of the target device by using information included in the specific signal is not executed in a case where it is determined that the related information is not included in the specific signal.

11 Claims, 10 Drawing Sheets

| Communication Type | Communication Protocol | Target Device | Determination Method | Determination Result |
|---|---|---|---|---|
| Type A | T2T | Authencation Card of Mifare Type | Data Size in SENS Signal and Data Size defined in Specification Match | Usable |
| | | | Data Size in SENS Signal and Data Size defined in Specification do not Match | Not Usable |
| | T4T | Authentication Card of Mifare Desfire Type or Mobile Terminal | 7thbit in SEL Signal:ON | Not Usable (Mobile Terminal) |
| | | | 7thbit in SEL Signal:OFF and Data Size in SENS Signal:4bytes | Not Usable (Mobile Terminal) |
| | | | 7thbit in SEL Signal:OFF and Data Size in SENS Signal:7bytes | Usable (Authentication Card) |
| Type B | T4T | Authentication Card or Mobile Terminal | - | Not Usable |
| Type F | T3T | Authentication Card or Mobile Terminal | PAD0 in SENSF Signal Indicates Predetermined Type | Not Usable (Mobile Terminal) |
| | | | PAD0 in SENSF Signal does not Indicate Predetermined Type | Usable (Authentication Card) |
| Type V | T5T | Authentication Card | - | Usable |

(51) Int. Cl.
*H04L 29/06* (2006.01)
*H04W 4/80* (2018.01)
*H04W 76/14* (2018.01)
*H04W 88/06* (2009.01)

(52) U.S. Cl.
CPC ........... *H04W 12/06* (2013.01); *H04W 76/14* (2018.02); *H04N 2201/0041* (2013.01); *H04N 2201/0094* (2013.01); *H04W 88/06* (2013.01)

(58) Field of Classification Search
USPC ...................................................... 358/1.14
See application file for complete search history.

(56) References Cited

U.S. PATENT DOCUMENTS

2015/0092225 A1    4/2015  Kaigawa
2017/0289742 A1*  10/2017  Asakura .............. H04W 76/023
2017/0289743 A1*  10/2017  Asakura .............. H04W 76/023

* cited by examiner

FIG. 5

| Communication Type | Determination Method Of Communication Protocol | Communication Protocol |
|---|---|---|
| Type A | 3rdbit:OFF and 6thbit:ON in SEL Signal | T4T |
| Type A | 3rdbit:OFF and 6thbit:OFF in SEL Signal | T2T |
| Type A | 3rdbit:ON in SEL Signal | Not Supported |
| Type B | SENSB Signal Includes Support Information | T4T |
| Type B | SENSB Signal does not Include Support Information | Not Supported |
| Type F | SENSF Signal Includes Support Information | T3T |
| Type F | SENSF Signal does not Include Support Information | Not Supported |
| Type V | Receive Interpretable Inventory Signal | T5T |
| Type V | Not Receive Interpretable Inventory Signal | Not Supported |

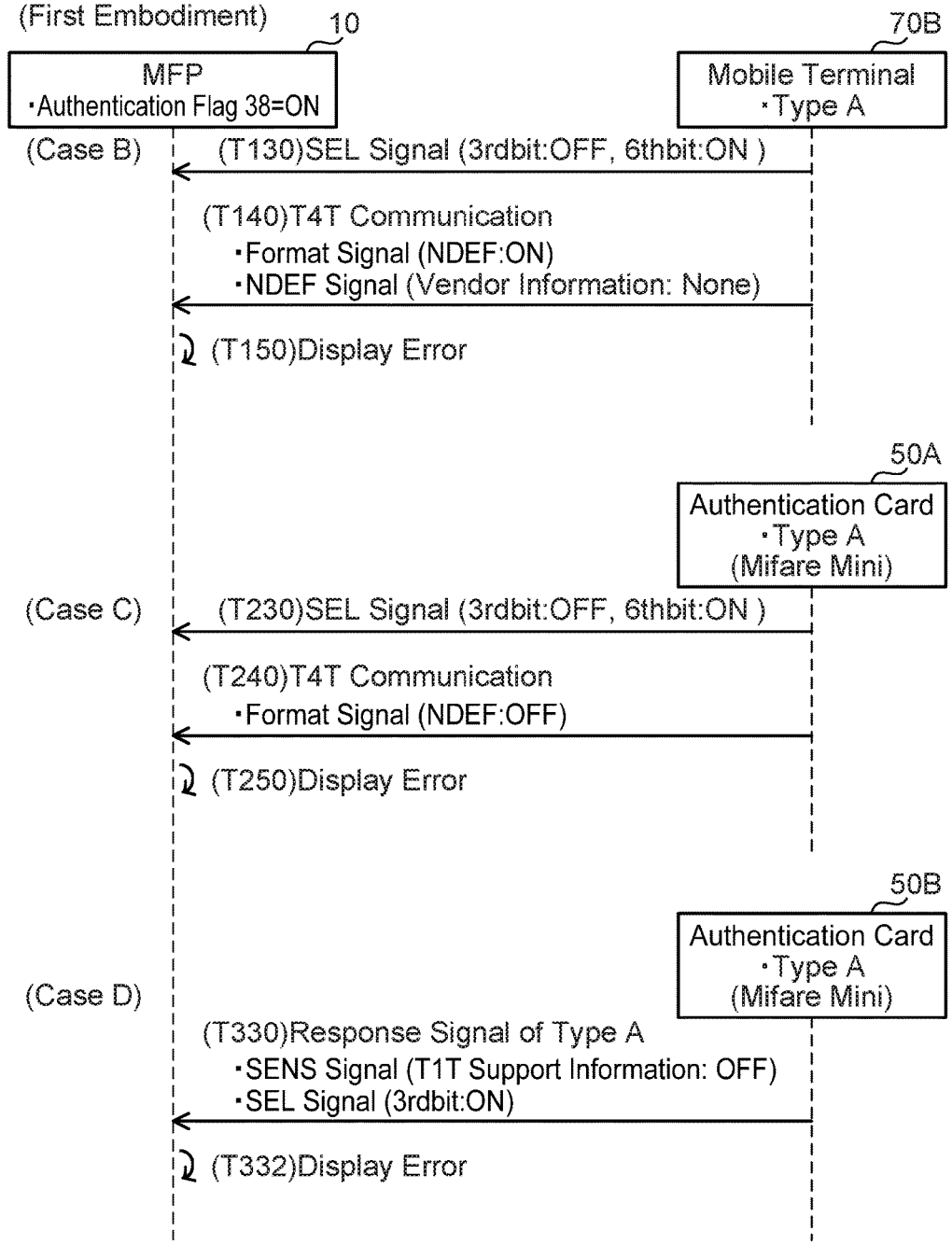

FIG. 8

| Communication Type | Communication Protocol | Target Device | Determination Method | Determination Result |
|---|---|---|---|---|
| Type A | T2T | Authentication Card of Mifare Type | Data Size in SENS Signal and Data Size defined in Specification Match | Usable |
| Type A | T2T | Authentication Card of Mifare Type | Data Size in SENS Signal and Data Size defined in Specification do not Match | Not Usable |
| Type A | T4T | Authentication Card of Mifare Desfire Type or Mobile Terminal | 7thbit in SEL Signal:ON | Not Usable (Mobile Terminal) |
| Type A | T4T | Authentication Card of Mifare Desfire Type or Mobile Terminal | 7thbit in SEL Signal:OFF and Data Size in SENS Signal:4bytes | Not Usable (Mobile Terminal) |
| Type A | T4T | Authentication Card of Mifare Desfire Type or Mobile Terminal | 7thbit in SEL Signal:OFF and Data Size in SENS Signal:7bytes | Usable (Authentication Card) |
| Type B | T4T | Authentication Card or Mobile Terminal | - | Not Usable |
| Type F | T3T | Authentication Card or Mobile Terminal | PAD0 in SENSF Signal Indicates Predetermined Type | Not Usable (Mobile Terminal) |
| Type F | T3T | Authentication Card or Mobile Terminal | PAD0 in SENSF Signal does not Indicate Predetermined Type | Usable (Authentication Card) |
| Type V | T5T | Authentication Card | - | Usable |

FIG. 9

Type A

SENS Signal ( Data Size )

SDD Signal ( NFCID1 )

SEL Signal ( 3rdbit:ON or OFF
6thbit:ON or OFF
7thbit:ON or OFF )

Type B

SENSB Signal ( NFCID0 )

Type F

SENSF Signal ( PAD0, NFCID2 )

Type V

Inventory Signal ( UID )

FIG. 10

(Second Embodiment)

10 MFP
- Authentication Flag 38=ON

50C Authentication Card
- Type A
- (Mifare Mini)
- NFCID1=A5

(Case E)

(T430) Response Signal of Type A
- SENS Signal (Data Size:4bytes)
- SDD Signal (NFCID1:A5)
- SEL Signal (3rdbit:OFF, 6thbit:OFF)

(T440) T2T Communication
- Format Signal (NDEF:OFF)

(T450) Extract A5

(T452) Authentication (Third Embodiment)

50D Authentication Card
- Type B
- NFCID0=A6
- Identification ID=A7

(Case F)

(T530) Response Signal of Type B
- SENSB Signal (NFCID0:A6)

(T540) T4T Communication
- Format Signal (NDEF:OFF)
- Non-dependent Signal (Identification ID:A7)

(T550) Extract A7

(T552) Authentication

COMMUNICATION DEVICE CAPABLE OF EXECUTING AUTHENTICATION OF TARGET DEVICE

TECHNICAL FIELD

The present disclosure relates to a communication device capable of executing an authentication of a target device.

BACKGROUND ART

A technique is known relating to authentication using a terminal, a service providing device, and an authentication device. Using a non-contact IC card reader, the terminal reads a chip ID from a non-contact IC card or a mobile phone, and sends the chip ID to the service providing device. The service providing device sends a qualification authentication request including the chip ID to the authentication device. The authentication device executes an authentication of the chip ID, and sends qualification authentication information indicating presence or absence of a customer's qualification to the service providing device. The service providing device operates the terminal according to the qualification authentication information.

SUMMARY

As described above, a technique is known in which a terminal reads an ID in a signal sent from a plurality of types of devices (i.e., a non-contact IC card and a mobile phone), and executes the authentication. Each device is usually manufactured by a different vendor. Therefore, rules for describing the ID in the signal sent from each device are usually different between the devices. For example, for the non-contact IC card, a first rule is determined in which an ID having a first data size is described in a first position in the signal and, for the mobile phone, a second rule is determined in which an ID having a second data size different from the first data size is described in a second position different from the first position in the signal. The terminal reads the ID according to the first rule in a case where the non-contact IC card is brought close, and reads the ID according to the second rule in a case where the mobile phone is brought close. Consequently, the terminal must have a plurality of programs corresponding to the plurality of rules.

The present disclosure relates a communication device capable of executing an authentication by acquiring identification information according to a common rule from a plurality of types of devices.

A communication device may comprise a wireless interface configured to perform a wireless communication according to a predetermined standard; a processor; and a memory storing computer-readable instructions therein, the computer-readable instructions, when executed by the processor, causing the communication device to: receive any one signal among two or more types of signals according to two or more types of modulation schemes defined by the predetermined standard from a target device via the wireless interface; receive format information from the target device via the wireless interface if the any one signal among the two or more types of signals is received, the format information including information indicating whether or not the target device supports a predetermined format defined by the predetermined standard, the predetermined format being for describing information in a signal; receive a specific signal including information described in the predetermined format from the target device via the wireless interface in a case where the format information indicates that the target device supports the predetermined format, wherein the specific signal is not received in a case where the format information indicates that the target device does not support the predetermined format; determine whether or not related information related to a predetermined application software is included in the specific signal; and execute an authentication of the target device by using first identification information included in the specific signal in a case where it is determined that the related information is included in the specific signal, wherein the authentication of the target device by using information included in the specific signal is not executed in a case where it is determined that the related information is not included in the specific signal.

A control method, computer-readable instructions, and a non-transitory computer-readable medium storing the computer-readable instructions, for implementation of the aforementioned communication device are also novel and useful. Further, a communication system which comprises the aforementioned communication device and the target device, are also novel and useful.

BRIEF DESCRIPTION OF THE DRAWINGS

FIG. 3 shows a flowchart of processes at a time when the authentication flag is ON;
FIG. 5 is a table showing whether or not a communication protocol is supported;
FIG. 7 shows a sequence diagram of a case in which authentication is not performed;
FIG. 8 is a table for determining whether a device ID is usable for authentication in a second embodiment;
FIG. 9 shows each response signal corresponding to each communication type;
and
FIG. 10 shows a sequence diagram of the second embodiment and a third embodiment.

EMBODIMENTS (Configuration of Communication System 2; FIG. 1)
As shown in FIG. 1, a communication system 2 comprises a multi-function peripheral 10 (called "MFP (abbreviation of Multi-Function Peripheral)" below), an authentication card 50, and a mobile terminal 70. The devices 10, 50, 70 are capable of performing a wireless communication (called "NFC (abbreviation of Near Field Communication) communication" below) according to the NFC system.

Figure 1:
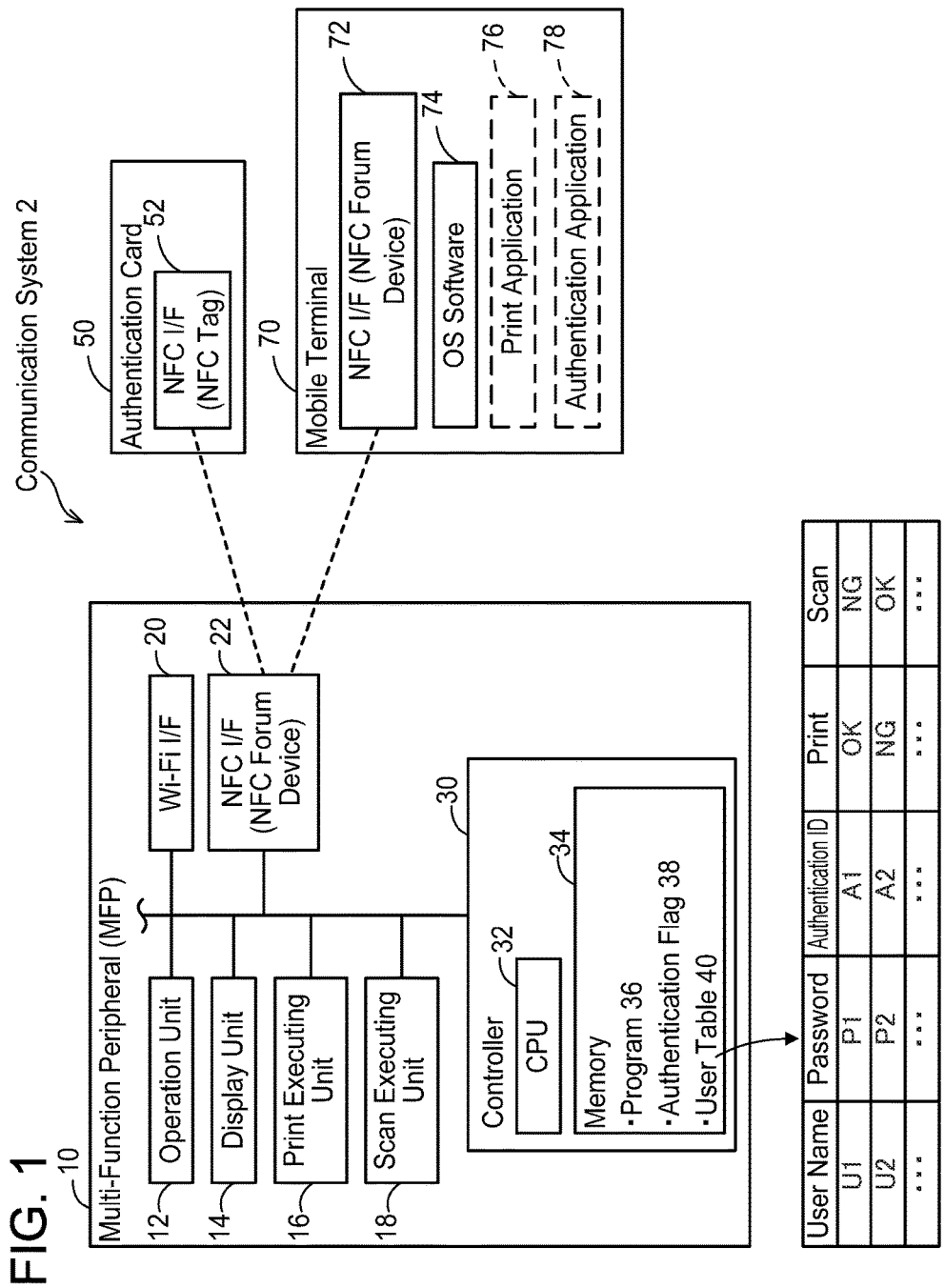
FIG. 1 shows a configuration of a communication system.

(Configuration of MFP 10)
The MFP 10 comprises an operation unit 12, a display unit 14, a print executing unit 16, a scan executing unit 18, a Wi-Fi interface (interface is described as "I/F" below) 20, an NFC I/F 22, and a controller 30.

The operation unit 12 comprises a plurality of keys. A user can input various instructions to the MFP 10 by operating the operation unit 12. The display unit 14 is a display for displaying various kinds of information. The display unit 14 also functions as a so-called touch panel. That is, the display unit 14 also functions as an operation unit. The print executing unit 16 comprises a printing mechanism such as ink jet scheme, laser scheme, etc. The scan executing unit 18 comprises a scanning mechanism such as CCD, CIS, etc.

The Wi-Fi I/F 20 is an I/F for performing a wireless communication (called "Wi-Fi communication" below) according to the Wi-Fi system. The Wi-Fi system is a wireless communication system based on, e.g., IEEE (abbreviation of The Institute of Electrical and Electronics Engineers, Inc.) standard 802.11 and standards conforming thereto (e.g., 802.11a, 11b, 11g, 11n, etc.). More specifically, the Wi-Fi I/F 20 supports the WFD (abbreviation of Wi-Fi Direct (registered trademark)) system developed by the Wi-Fi Alliance. The WFD system is a wireless communication system described in the standard document "Wi-Fi Peer-to-Peer (P2P) Technical Specification Version1.1" created by the Wi-Fi Alliance.

The NFC I/F 22 is an I/F for performing an NFC communication. The NFC system is a wireless communication system based on e.g., international standards such as ISO/IEC14443, 15693, 18092, etc. Moreover, an I/F called an NFC forum device and an I/F called an NFC tag are known as types of I/F for performing an NFC communication. The NFC forum device is an I/F capable of selectively operating in any of P2P (abbreviation of Peer To Peer) mode, R/W (abbreviation of Reader/Writer) mode, and CE (abbreviation of Card Emulation) mode. The NFC tag is not an I/F capable of selectively operating in any of these modes, and functions as an IC (abbreviation of Integrated Circuit) tag of the NFC system.

P2P mode is a mode for performing bidirectional communication between one NFC apparatus operating in P2P mode and another NFC apparatus operating in P2P mode. R/W mode and CE mode are modes for performing unidirectional communication between one NFC apparatus operating in R/W mode and another NFC apparatus operating in CE mode. Moreover, CE mode includes normal CE mode requiring a secure element, and HCE (abbreviation of Host Card Emulation) mode not requiring a secure element. The Reader mode in the R/W mode is a mode for reading data from an NFC apparatus operating in CE mode. The Writer mode in the R/W mode is a mode for writing data to an NFC apparatus operating in CE mode. Moreover, an NFC apparatus operating in R/W mode can read data from an NFC tag, and write data to the NFC tag.

The NFC I/F 22 is an NFC forum device. The NFC I/F 22 sends e.g., a Polling signal and, in case of receiving a response signal to that signal from a partner apparatus, establishes an NFC communication link with the partner apparatus. Further, the NFC I/F 22 establishes an NFC communication link with the partner apparatus in case of, e.g., receiving a Polling signal from the partner apparatus, and sending a response signal to that signal to the partner apparatus.

Here, NFC communication will be described in detail. NFC communication is classified into four communication types (i.e., type A, type B, type F, and type V). The same frequency (i.e., 13.56 MHz) is used in each communication type. However, a combination of communication standard, modulation scheme, and coding scheme is different for each communication type. Type A is a communication conforming to communication standards "ISO/IEC14443 and 18092", modulation scheme "ASK (abbreviation of Amplitude Shift Keying) 100%", and coding scheme "Manchester". Type B is a communication conforming to communication standard "ISO/IEC14443", modulation scheme "ASK10%", and coding scheme "NRZ (abbreviation of Non Return to Zero)". Type F is a communication conforming to communication standard "ISO/IEC18092", modulation scheme "ASK10%", and coding scheme "Manchester". Type V is a communication conforming to communication standard "ISO/IEC15693", modulation scheme "ASK10% or 100%", and coding scheme "Manchester".

Next, differences between the Wi-Fi I/F 20 and the NFC I/F 22 will be described. A communication speed of a Wi-Fi communication via the Wi-Fi I/F 20 (e.g., maximum communication speed is 11 to 600 Mbps) is faster than a communication speed of an NFC communication via the NFC I/F 22 (e.g., maximum communication speed is 100 to 424 Kbps). Further, a frequency of a carrier wave upon a Wi-Fi communication via the Wi-Fi I/F 20 (e.g. a 2.4 GHz band or 5.0 GHz band) is different from a frequency of a carrier wave upon an NFC communication via the NFC I/F 22 (e.g. a 13.56 MHz band). Further, a maximum distance with which a Wi-Fi communication that can be performed via the Wi-Fi I/F 20 (e.g., about 100 m at maximum) is longer than a maximum distance with which an NFC communication that can be performed via the NFC I/F 22 (e.g., about 10 cm at maximum).

The controller 30 comprises a CPU 32 and a memory 34. The CPU 32 performs various processes in accordance with a program 36 stored in the memory 34. The memory 34 is configured by a volatile memory, non-volatile memory, etc. Further, the memory 34 stores an authentication flag 38 and a user table 40. The authentication flag 38 indicates either a value "ON" meaning performing authentication using user information, or a value "OFF" meaning not performing authentication. The authentication flag 38 is set to "ON" or "OFF" by an administrator of the MFP 10.

A user name, a password, an authentication ID, print allowing information, and scan allowing information are associated with each other in the user table 40. The user name, the password, the print allowing information, and the scan allowing information are registered in the user table 40 by, e.g., the administrator of the MFP 10 operating the operation unit 12, or accessing the MFP 10 from a terminal device. The print allowing information and the scan allowing information respectively indicate whether or not the user is allowed to perform the print function and scan function. "OK" in both types of the allowing information indicates that use of the function is allowed, and "NG" indicates that use of the function is not allowed. The authentication ID is identification information for identifying the authentication card 50 or the mobile terminal 70, and is extracted and registered from the authentication card 50 or the mobile terminal 70 by a process to be described later. Here, the term "identification information" including the authentication ID as an example may be information unique to one device, may be information identifying a component (e.g., software) in the device, or may be information indicating a model of the device. That is, the identification information is not restricted to information identifying one device itself, but also includes information identifying a certain concept. Moreover, in a modification, the user table 40 may be stored in a memory of an external device different from the MFP 10. In this case, the MFP 10 can communicate with the external device, and use the information in the user table 40.

(Configuration of Authentication Card 50)

The authentication card 50 comprises an NFC I/F 52 which is an NFC tag. The authentication card 50 usually does not have OS software or an application. The NFC I/F 52 corresponds to one type of the types A, B, F, and V (in other words, supports only one type). The NFC I/F 52 corresponding to type A is an I/F (i.e., card) conforming to communication standard "ISO/IEC14443" and is further classified into an I/F conforming to specific standard "ISO/IEC14443-4" conforming to communication standard "ISO/IEC14443", and an I/F not conforming to specific standard "ISO/IEC14443-4". The former I/F is a Mifare Desfire type card conforming to a specific communication protocol "T-CL" for non-contact cards, and includes e.g., Mifare ProX, Mifare SmartMX, Mifare Desfire, etc. Further, the latter I/F is a Mifare (registered trademark) type card not conforming to the communication protocol "T-CL", and includes e.g., Mifare Ultralight, Mifare Mini, etc. The NFC I/F 52 corresponding to type F is a card conforming to communication standard "ISO/IEC18092", and is e.g., a card such as FeliCa Standard, FeliCa Lite, etc. Further, the NFC I/F 52 corresponding to type V is a card conforming to communication standard "ISO/IEC15693".

(Configuration of Mobile Terminal 70)

The mobile terminal 70 is a portable terminal device such as a mobile telephone, a smartphone, a PDA, a notebook PC, a tablet PC, a portable music playback device or a mobile movie playback device. The mobile terminal 70 comprises an NFC I/F 72 and OS software 74. The NFC I/F 72 is an NFC forum device. The OS software 74 is software for controlling various basic operations of the mobile terminal 70. Further, although not shown, the mobile terminal 70 further comprises a Wi-Fi I/F for performing Wi-Fi communication.

The mobile terminal 70 may further comprise a print application 76 and an authentication application 78. The print application 76 is an application for causing the MFP 10 to perform a print function. The authentication application 78 is an application for causing the MFP 10 to perform authentication by using the mobile terminal 70. The applications 76, 78 are applications provided by a vendor of the MFP 10, and are installed on the mobile terminal 70 from, e.g., a server on the Internet.

Figure 2:
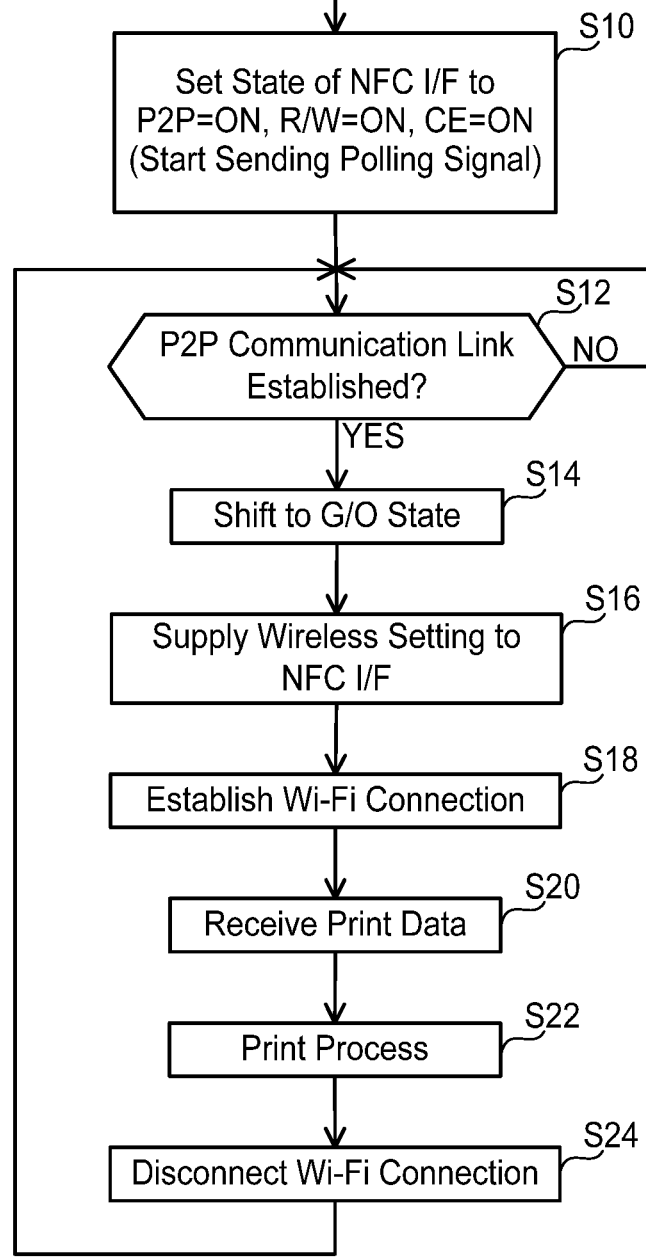
FIG. 2 shows a flowchart of processes at a time when an authentication flag is OFF.

(Process at Time when Authentication Flag is OFF; FIG. 2)

Next, processes performed by the CPU 32 in a case where the authentication flag 38 is set to "OFF" will be described with reference to FIG. 2. The process of FIG. 2 is started when the power of the MFP 10 is turned ON, or when an operation for changing the authentication flag 38 from "ON" to "OFF" is performed on the operation unit 12.

In S10, the CPU 32 sets mode state of the NFC I/F 22 to a mode state in which P2P mode, R/W mode, and CE mode are all ON. In this case, the NFC I/F 22 can operate in any of the above three modes. Moreover, in a modification, in S10, the CPU 32 may set the mode state to a mode where only P2P mode is ON, or may set the mode state to a mode where P2P mode is ON and R/W mode or CE mode is ON. That is, the CPU 32 may set the mode state to the mode where at least P2P mode is ON.

In S10, the CPU 32 further instructs the NFC I/F 22 to send four types of Polling signals corresponding to the types A, B, F, and V. As a result, the NFC I/F 22 repeatedly sends each Polling signal corresponding to each type in sequence.

In S12, the CPU 32 monitors whether a P2P communication link with the mobile terminal 70 has been established. The user brings the mobile terminal 70 comprising the NFC I/F 72 in which P2P mode is ON close to the MFP 10. In this case, the distance between the mobile terminal 70 and the MFP 10 becomes smaller than a maximum distance (e.g., 10 cm) with which NFC communication can be performed, and consequently a P2P communication link is established. In case of acquiring information from the NFC I/F 22 indicating that the P2P communication link has been established, the CPU 32 determines YES in S12, and proceeds to S14.

In S14, the CPU 32 shifts the operating state of the MFP 10 from device state of the WFD system to Group Owner state (called "G/O state" below) of the WFD system. Device state is a state in which of operating as neither a parent station nor child station of a wireless network conforming to the WFD system. G/O state is a state of operating as a parent station of the wireless network. Moreover, in a modification, instead of shifting to G/O state of the WFD system, the CPU 32 may activate a so-called Soft AP (abbreviation of Access Point), and operate as a parent station of the wireless network. In S14, the CPU 32 further determines wireless setting (i.e., SSID and password) to be used in the wireless network. The SSID is an identifier for identifying the wireless network. The password is a character string used for authentication and encryption in the wireless network. The CPU 32 determines the wireless setting by, e.g., acquiring a predetermined character string, or randomly extracting a character string.

In S16, the CPU 32 supplies the wireless setting determined in S14 to the NFC I/F 22. As a result, the NFC I/F 22 sends the wireless setting to the mobile terminal 70 via the P2P communication link. Due to this, in a case where the mobile terminal 70 receives the wireless setting and the mobile terminal 70 comprises the print application 76, the wireless setting is used in the mobile terminal 70. Then, various signals for establishing a Wi-Fi connection complying with the Wi-Fi scheme are sent from the mobile terminal 70 to the MFP 10.

In S18, the CPU 32 establishes the Wi-Fi connection with the mobile terminal 70 via the Wi-Fi I/F 20. Specifically, the CPU 32 receives a signal including the aforementioned SSID, a signal including the password, etc., and establishes the Wi-Fi connection when authentication of the password succeeds.

In S20, the CPU 32 receives print data representing an image of a print target from the mobile terminal 70 via the Wi-Fi I/F 20 by using the Wi-Fi connection established in S18. As described above, the communication speed of Wi-Fi communication is faster than the communication speed of NFC communication. Therefore, the MFP 10 can receive the print data from the mobile terminal 70 more quickly than in a configuration communicating the print data by using an NFC communication.

In S22, the CPU 32 supplies the print data received in S20 to the print executing unit 16, and causes the print executing unit 16 to perform a print. Moreover, in a modification, instead of S20 and S22, the CPU 32 may cause the scan executing unit 18 to scan a document, and send scan data to the mobile terminal 70 via the Wi-Fi I/F 20 by using the Wi-Fi connection. Thus, in a situation where the authentication flag 38 is set to "OFF", the MFP 10 performs the print function and the scan function when receiving an instruction from any user, without authenticating the user information (S20, S22).

In S24, the CPU 32 disconnects the Wi-Fi connection established in S18 and, further, shifts the operating state of the MFP 10 from G/O state to device state. When S24 ends, the process returns to S12.

Figure 3:
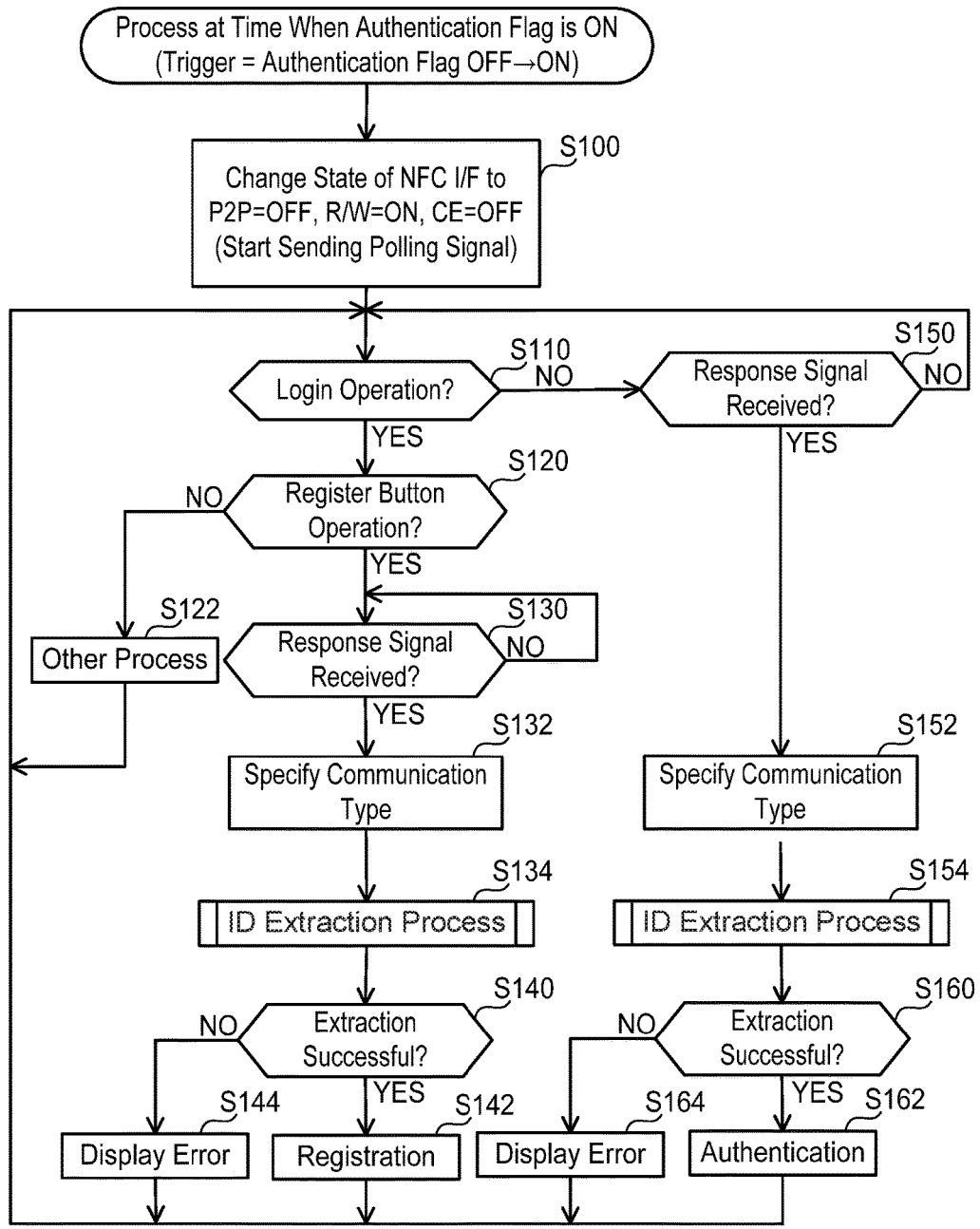

(Process at Time when Authentication Flag is ON; FIG. 3)

Next, processes performed by the CPU 32 in a case where the authentication flag 38 is set in "ON" will be described with reference to FIG. 3. When an operation for changing the authentication flag 38 from "OFF" to "ON" is performed on the operation unit 12, the processes of FIG. 3 are started. Moreover, below, the authentication card 50 and the mobile terminal 70 may be collectively called "target device".

In S100, the CPU 32 sets the mode state of the NFC I/F 22 to a state in which P2P mode and CE mode are OFF and R/W mode is ON. In this case, the NFC I/F 22 can operate only in R/W mode of the above three modes. In a situation where the authentication flag 38 is set in "ON", registration or authentication of the ID of the target device is performed. Here, in a case where the target device is the authentication card 50, the NFC I/F 22 must operate in R/W mode (more specifically, Reader mode) in order to receive the ID from the authentication card 50 (i.e., the NFC I/F 52 which is an NFC tag). Further, the mobile terminal 70 can send the ID by using an NFC communication according to the authentication application 78. Here, the authentication application 78 is programmed to send the ID in the state where the NFC I/F 72 is operating in CE mode. Therefore, even in a case where the target device is the mobile terminal 70, the NFC I/F 22 must operate in R/W mode (more specifically, Reader mode) in order to receive the ID from the mobile terminal 70 (i.e., the NFC I/F 72 which is an NFC forum device). Thus, since the NFC I/F 22 must operate in R/W mode in order to receive the ID from the target device, in S100, the NFC I/F 22 is set to a mode state capable of operating only in R/W mode.

In S100, the CPU 32 further instructs the NFC I/F 22 to send the four types of Polling signals corresponding to types A, B, F, and V. As a result, the NFC I/F 22 repeatedly sends each Polling signal corresponding to each type in sequence.

In S110, the CPU 32 monitors whether a login operation has been performed on the operation unit 12 by the user. In a case where the combination of a user name and a password registered in the user table 40 has been input to the operation unit 12, the CPU 32 determines YES in S110, and proceeds to S120.

In S120, the CPU 32 determines whether or not a registration button for registering the authentication ID in the user table 40 has been operated. In case of determining that the registration button has been operated (YES in S120), the CPU 32 proceeds to S130. On the other hand, in case of determining that a button different from the registration button has been operated (NO in S120), in S122 the CPU 32 performs a process corresponding to that different button. For example, in a case where a button for receiving print data from an external server and performing a print has been operated, the CPU 32 determines whether or not the print allowing information corresponding to the user information input in S110 (i.e., the user name and the password) is "OK". In case of determining "OK", the CPU 32 receives the print data, and supplies the print data to the print executing unit 16. Further, e.g., in a case where a button for performing a scan has been operated, the CPU 32 determines whether or not the scan allowing information corresponding to the user information input in S110 is "OK". In case of determining "OK", the CPU 32 causes the scan executing unit 18 to perform a scan. When S122 ends, the process returns to S110. Moreover, in a modification, the CPU 32 may accept an operation for performing the process of S122 even if the login operation is not performed again after S122 ends. This state may continue until a logout operation is performed by the user.

In S130, the CPU 32 monitors whether a response signal to the Polling signal has been received from the target device via the NFC I/F 22. As described above, the NFC I/F 22 repeatedly sends each Polling signal corresponding to each type in sequence. In case of receiving a response signal to this signal when, e.g., a Polling signal corresponding to type A has been sent, the NFC I/F 22 supplies information indicating type A to the controller 30. Similarly, in case of receiving a response signal corresponding to another communication type, the NFC I/F 22 supplies information indicating that type to the controller 30. In case of acquiring the aforementioned information from the NFC I/F 22, the CPU 32 determines YES in S130, and proceeds to S132. As described above, the modulation scheme "ASK100%" is used in type A, and the modulation scheme "ASK10%" is used in types B or F. Consequently, at least two types of Polling signals of the four types of Polling signals have different modulation schemes. Consequently, the response signal received in S130 (or S150, to be described) is one of the two or more types of response signal corresponding to the two or more types of modulation scheme.

In S132, based on the information acquired in S130, the CPU 32 specifies the communication type for receiving the response signal. Then, in S134, the CPU 32 performs an ID extraction process (see FIG. 4). Since the NFC I/F 22 is operating only in R/W mode, the CPU 32 can function as a Reader, and therefore can receive the signal from the target device, and read (i.e., extract) the ID in the signal.

In S140, the CPU 32 determines whether or not the ID has been successfully extracted. In a case where the ID has been successfully extracted (e.g., see "Normal END" of FIG. 4), the CPU 32 determines YES in S140, and in S142, registers the ID extracted in S134 in the user table 40 as the authentication ID corresponding to the user information input in S110. In a case where an authentication ID corresponding to the user information input in S110 has already been registered, in S142, the CPU 32 overwrites and registers the ID of the target device as the authentication ID corresponding to the user information. Moreover, in a modification, in a case where the authentication ID corresponding to the user information input in S110 has already been registered, the CPU 32 may newly register, in the user table 40, new information in which the user information and the ID of the target device are associated with one another. That is, in this case, a plurality of authentication IDs is registered for one piece of user information.

On the other hand, in a case where extraction of the ID has failed (e.g., see "Error END" of FIG. 4), the CPU 32 determines NO in S140 and, in S144, causes the display unit 14 to display an error screen indicating that the registration of the authentication ID is impossible to be executed. Due to this, the user can know that the registration of the authentication ID has failed. When S142 or S144 ends, the CPU 32 returns to S110.

Further, in S150, the CPU 32 monitors whether a response signal to the Polling signal is received from the target device via the NFC I/F 22. S150 is the same as S130. Further, S152, S154, and S160, which are performed in the case of YES in S150, are the same as S132, S134, and S140.

In S162, the CPU 32 authenticates the ID extracted in S154, i.e., authenticates the target device. The CPU 32 determines that the authentication has succeeded in a case where an authentication ID matching the extracted ID is registered in the user table 40. In this case, the CPU 32 performs the function allowed for the user in accordance with the instruction from the user, in the same manner as the process described in S122. Here, the CPU 32 may, e.g., cause the display unit 14 to display a screen indicating a list of functions allowed for the user, and accept an instruction for selecting a function from that list. By causing the MFP 10 to authenticate the target device, the user can cause the MFP 10 to perform the function even without performing the login operation. Moreover, in a case where an authentication ID matching the ID of the target device is not registered in the user table 40, the CPU 32 determines that authentication has failed, and may, for example, cause the display unit 14 to display an error screen, and return to S110. Moreover, in a modification, the CPU 32 may accept an operation for performing a process according to an instruction from the user even if authentication has not been performed again after S162 ends. This state may continue until a logout operation is performed by the user.

On the other hand, in a case where extraction of the ID failed, the CPU 32 determines NO in S160 and, in S164, causes the display unit 14 to display an error screen indicating that authentication of the ID (i.e., authentication of the target device) is impossible to be executed. Due to this, the user can know that authentication has failed. In this case, the CPU 32 does not perform the print function and scan function. When S162 or S164 ends, the process returns to S110. Moreover, in a modification, instead of displaying the error screen (i.e., S144 and S164), a sound indicating error may be output, or an image indicating error may be printed.

Figure 4:
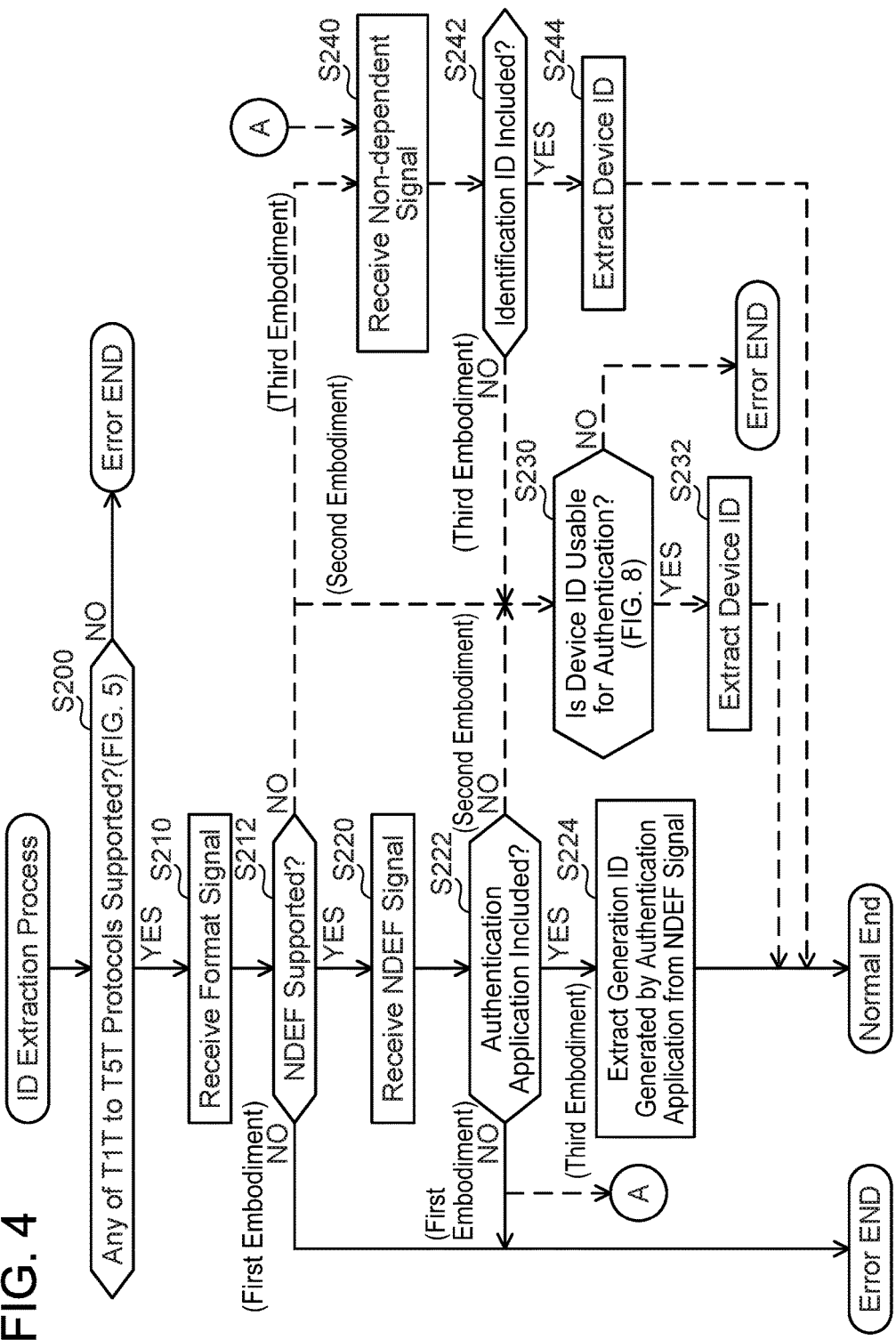
FIG. 4 shows a flowchart of an ID extraction process.

(ID Extraction Process; FIG. 4)

Next, contents of a process executed in S134 or S154 of FIG. 3 will be described with reference to FIG. 4. Before describing the contents of the process, communication layers of the NFC communication will be described. The communication layers of the NFC communication include an analog layer which is the lowest layer, a digital protocol layer which is an upper layer of the analog layer, an activity layer which is an upper layer of the digital protocol layer, and T1T to T5T layers which are upper layers of the activity layer. The response signals of S130, S150 of FIG. 3 are communicated by using the communication layers of the activity layer or lower without using the communication layers of the T1T to T5T layer or higher. On the other hand, the signals of S210 and S220 of FIG. 4, to be described, are communicated by using the communication layers of the T1T to T5T layers.

In S200, by using the response signal received in S130 or S150 of FIG. 3, the CPU 32 determines whether the target device is capable of performing communication in the T1T to T5T layers, i.e., whether or not the target device supports any of the T1T to T5T communication protocols defined by the NFC standard. Specifically, the CPU 32 performs the determination based on the communication type specified in S132, and the table of FIG. 5.

As shown in FIG. 5, in a case where the specified communication type is type A, the CPU 32 performs the determination based on the information of the third bit and sixth bit in the SEL (abbreviation of SEL_RES Response) signal included in the response signal. Specifically, in a case where the third bit in the SEL signal indicates ON, the CPU 32 determines that the target device does not support any communication protocol of T1T to T5T regardless of the information of the sixth bit in the SEL signal. Moreover, an SENS (abbreviation of SENS_RES Response) signal included in the response signal may include T1T support information indicating whether or not the target device supports T1T. In a case where the third bit in the SEL signal indicates ON, and the T1T support information in the SENS signal indicates OFF, the CPU 32 may determine that the target device does not support any communication protocol of T1T to T5T. Further, in a case where the third bit in the SEL signal indicates OFF, the CPU 32 determines that the target device supports T4T if the sixth bit in the SEL signal indicates ON, and determines that the target device supports T2T if the sixth bit in the SEL signal indicates OFF.

In a case where the specified communication type is type B, the CPU 32 determines whether or not an SENSB (abbreviation of SENSB_RES Response) signal included in the response signal includes support information indicating that T4T is supported. The CPU 32 determines that the target device supports T4T in a case where the SENSB signal includes the support information, and determines that the target device does not support any communication protocol of T1T to T5T in a case where the SENSB signal does not include the support information. A case where the specified communication type is type F is the same as the case of type B, with the exception that an SENSF (abbreviation of SENSF_RES Response) signal included in the response signal is used instead of the SENSB signal, and that support information indicating that T3T is supported is used instead of the support information indicating that T4T is supported.

Further, in a case where the specified communication type is type V, the CPU 32 determines whether or not the Inventory signal included in the response signal is interpretable. The CPU 32 determines that the target device supports T5T in a case where the Inventory signal is interpretable, and determines that the target device does not support any communication protocol of T1T to T5T in a case where the Inventory signal is not interpretable.

In S200 of FIG. 4, in a case of determining that the target device supports any communication protocol of T1T to T5T (YES in S200), the CPU 32 proceeds to S210. On the other hand, in a case of determining that the target device does not support any communication protocol of T1T to T5T (NO in S200), since the signals of S210 and S220 cannot be received, the CPU 32 ends the process of FIG. 4 as error END. As a result, NO is determined in S140 or S160 of FIG. 3.

In S210, the CPU 32 performs a communication using the communication protocol specified in S200, i.e., a communication using any of the T1T to T5T communication layers (called "upper layer communication" below), with the target device via the NFC I/F 22. In the upper layer communication, the CPU 32 sends a request signal to the target device, and receives a response signal from the target device. This response signal includes a Format signal including Format information. The Format information indicates whether or not the target device supports NDEF (abbreviation of NFC Data Exchange Format). In a case of supporting NDEF, the target device can perform communication of an NDEF signal that includes an NDEF area and, in a case of not supporting NDEF, the target device can not perform communication of the NDEF signal. The NDEF area is an area in which information can be described freely. For example, in a case where the target device is the mobile terminal 70, ID generated by the authentication application 78 (called "generation ID" below) is described in the NDEF area.

The generation ID is generated at a first activation of the authentication application 78. The authentication application 78 generates a generation ID having a predetermined number of bytes (e.g., 32 bytes) from a MAC address of the mobile terminal 70. Since the generation ID is generated from the unique MAC address which is not duplicated between two or more mobile terminals, the generation ID is a unique ID. Further, the generation ID that was generated at the first activation of the authentication application 78 (i.e., a fixed ID) is used continuously in the same mobile terminal 70. The authentication application 78 describes vendor information indicating a vendor of the authentication application 78 (i.e., vendor of the MFP 10) and the generation ID in the NDEF area. Moreover, in a modification, a unique ID which is not duplicated between two or more authentication applications may be pre-assigned to the authentication application 78. In this case, the authentication application 78 may describe the unique ID in the NDEF area. Further, in another modification, the authentication application 78 may supply the generation ID or a pre-assigned ID to the OS software 74, and the OS software 74 may describe the ID in the NDEF area. That is, the NDEF signal including the ID may be any signal sent according to the authentication application 78.

In S212, the CPU 32 determines whether or not the target device supports NDEF based on the Format information included in the Format signal. In a case of determining that the target device supports NDEF (YES in S212), the CPU 32 proceeds to S220. On the other hand, in a case of determining that the target device does not support NDEF (NO in S212), since a communication cannot be performed of the NDEF signal that includes the NDEF area in which the authentication application 78 can describe the ID, the CPU 32 ends the process of FIG. 4 as Error END without performing further communication. As a result, NO is determined in S140 or S160 of FIG. 3.

In S220, the CPU 32 performs further upper layer communication with the target device via the NFC I/F 22. In the upper layer communication, the CPU 32 sends a request signal to the the target device, and receives a response signal from the target device. The response signal includes the NDEF signal that includes the NDEF area.

In S222, the CPU 32 determines whether the target device does or does not comprise the authentication application 78 based on the described contents in the NDEF area included in the NDEF signal. Specifically, in a case where the vendor information indicating the vendor of the MFP 10 i.e., the vendor information indicating the vendor of the authentication application 78 is described in the NDEF area, the CPU 32 determines that the mobile terminal 70 comprises the authentication application 78 (YES in S222), and proceeds to S224. On the other hand, in a case where the vendor information is not described in the NDEF area, the CPU 32 determines that the target device does not comprise the authentication application 78 (NO in S222), and ends the process of FIG. 4 as Error END. Moreover, in a case where YES is determined in S212 and NO is determined in S222, this means that the target device has some application that uses NDEF but the application is not the authentication application 78.

In S224, the CPU 32 extracts the generation ID in the NDEF area. In this case, the CPU 32 ends the process of FIG. 4 as Normal END. As a result, YES is determined in S140 or S160 of FIG. 3, and the extracted generation ID is used in S142 or S162.

Figure 6:
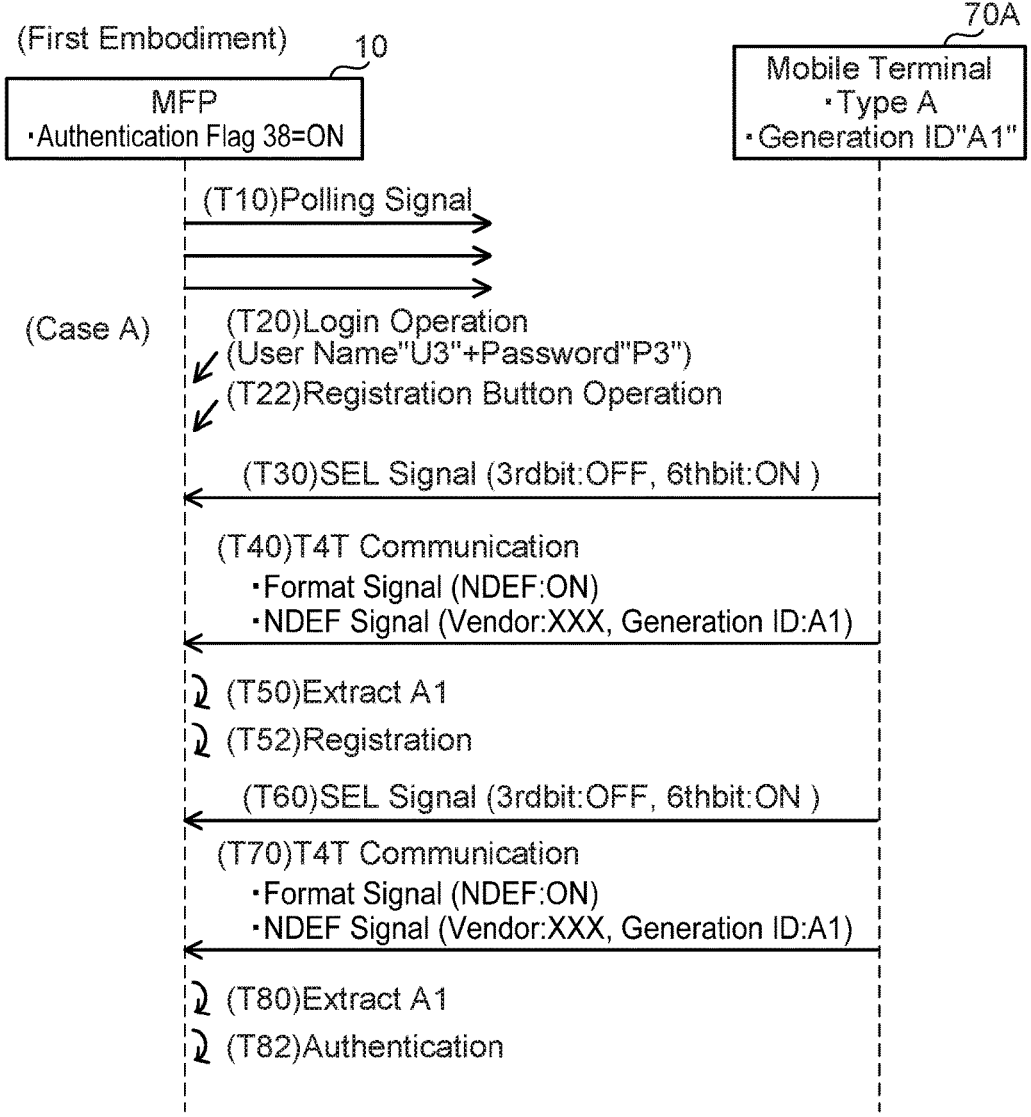
FIG. 6 shows a sequence diagram of a case in which authentication is performed.

(Specific Cases; FIG. 6 and FIG. 7)

Next, specific cases A to D realized by the processes of FIGS. 3 and 4 will be described with reference to FIGS. 6 and 7. In the initial state of cases A to D, the authentication flag 38 is set to "ON", and consequently only the R/W mode is ON in the NFC I/F 22 (S100 of FIG. 3).

In T10, the MFP 10 repeatedly sends the four types of Polling signals corresponding to the four types in sequence (S100 of FIG. 3).

In case A, the target device is a mobile terminal 70A whose communication type corresponds to type A. A generation ID "A1" generated at the first activation of the authentication application 78 is assigned to the mobile terminal 70A.

In T20, the MFP 10 accepts input of the user information including the combination of a user name "U3" and a password "P3" (i.e., accepts a login operation) (S110 of FIG. 3) and, in T22, accepts operation of the registration button (YES in S120).

In T30, in response to sending of the Polling signal of type A, the MFP 10 receives the SEL signal including the response signal of type A from the mobile terminal 70A (YES in S130). Since the third bit in the SEL signal indicates OFF, and the sixth bit indicates ON, the MFP 10 determines that the target device supports T4T (YES in S200 of FIG. 4) and, in T40, performs a T4T communication with the target device, and receives the Format signal including the Format information and the NDEF signal including the NDEF area from the mobile terminal 70A. Specifically, the MFP 10 first receives the Format signal (S210) and, since the Format information indicates that the mobile terminal 70A supports NDEF (YES in S212), further receives the NDEF signal (S220). Since vendor information "XXX" is included in the NDEF area (YES in S222), in T50, the MFP 10 extracts the generation ID "A1" from the NDEF area (S224). In T52, the MFP 10 registers the generation ID "A1" as the authentication ID in the user table 40 in association with the user information (S142 of FIG. 3).

Moreover, when T52 is completed, in T20 the MFP 10 logs off the user logged in, monitors a login operation of the user (S110), and monitors whether a response signal to the Polling signal has been received (S150). In this state, when the user again brings the mobile terminal 70A close to the MFP 10, in T60, the MFP 10 receives the response signal of type A (YES in S150), as in T30. In this case, the MFP 10 specifies type A (S152), and determines that the target device supports T4T (YES in S200 of FIG. 4). The subsequent steps T70, T80 are the same as T40, T50, respectively.

In T82, the MFP 10 authenticates the mobile terminal 70A (S162). Since the authentication ID "A1" matching the generation ID "A1" extracted in T80 is registered in the user table 40, the MFP 10 determines that authentication succeeded. In this case, the MFP 10 performs the function allowed for the user corresponding to the user name "U3".

(Case B: FIG. 7)

In case B, the target device is a mobile terminal 70B whose communication type corresponds to type A. The authentication application 78 is not installed on the mobile terminal 70B, but an application using NDEF and different from the authentication application 78 is installed.

T130, T140 are respectively the same as T60, T70 of case A of FIG. 6. However, since the vendor information is not included in the NDEF signal, the MFP 10 determines that the authentication application 78 is not installed on the target device (NO in S222). In this case, since the ID cannot be extracted (NO in S160 of FIG. 3), in T150, the MFP 10 displays an error screen (S164).

(Case C: FIG. 7)

In case C, the target device is an authentication card 50A whose communication type corresponds to type A, and is the Mifare Mini (i.e., Mifare type) authentication card 50A which does not support NDEF.

T230 is the same as T60 of case A. In T240, the MFP 10 performs a T4T communication with the target device, and receives a T4T response signal from the authentication card 50A. Specifically, the MFP 10 receives the Format signal (S210), and determines that the Format information indicates that the authentication card 50A does not support NDEF (NO in S212). In this case, T250 is performed in the same manner as T150 of case B.

(Case D: FIG. 7)

In case D, the target device is an authentication card 50B whose communication type corresponds to type A, and is the Mifare Mini (i.e., Mifare type) authentication card 50B which does not support any communication protocol of T1T to T5T.

In T330, in response to sending of the Polling signal of type A, the MFP 10 receives a response signal of type A including an SENS signal and an SEL signal from the authentication card 50B (YES in S130). Since the T1T support information in the SENS signal indicates OFF, and the third bit in the SEL signal indicates ON, the MFP 10 determines that the target device does not support any communication protocol of T1T to T5T (NO in S200 of FIG. 4). In this case, T332 is performed in the same manner as T150 of case B.

Effect of First Embodiment

For example, a situation is assumed in which a mobile terminal corresponding to type A (called "mobile terminal (A)" below) and a mobile terminal corresponding to type F (called "mobile terminal (F)" below) exist, and an ID is assigned to each of these mobile terminals. The mobile terminal (A) and the mobile terminal (F) correspond to different modulation schemes, and are of different kinds of devices. Consequently, rules for these mobile terminals to describe ID in the signal usually differ according to the vendor manufacturing each mobile terminal. For example, for the mobile terminal (A), a first rule is determined in which an ID having a first data size is described in a first position in a certain signal and, for the mobile terminal (F), a second rule is determined in which an ID having a second data size different from the first data size is described in a second position different from the first position in a certain signal. Consequently, a plurality of programs corresponding to the plurality of rules is needed in order to extract the ID from the respective mobile terminal (A) and mobile terminal (F).

By contrast, in the present embodiment, if any one of the two or more types of response signal corresponding to the two or more types of modulation scheme is received from the target device (YES in S150 of FIG. 3), i.e., even if a response signal is received from either of the mobile terminal (A) or the mobile terminal (F), in a case where the target device supports NDEF (YES in S212 of FIG. 4), and the vendor information is included in the NDEF signal (YES in S222), the MFP 10 authenticates the target device by using the generation ID described in the NDEF signal by the authentication application 78. Here, the generation ID is an ID generated by the authentication application 78 provided by the vendor of the MFP 10, and is described in the NDEF signal by the authentication application 78. Therefore, if not provided with the plurality of programs corresponding to the plurality of rules, the MFP 10 can acquire the generation ID according to the common rule (i.e., the authentication application 78) from the target device that includes the mobile terminal (A) and the mobile terminal (F), and appropriately authenticate the target device by using the generation ID. Moreover, even in a situation where a further mobile terminal corresponding to type B exists, the above effect can be obtained in the same way.

(Correspondence Relationship)

The MFP 10 is an example of "communication device". The authentication card 50 and the mobile terminal 70 are examples of "target device". The NFC I/F 22 is an example of "wireless interface". The authentication application 78 is an example of "predetermined application software". The vendor information is an example of "related information". The generation ID is an example of "first identification information". The response signal of each type to the Polling signal corresponding to each type is an example of "two or more types of signals corresponding to two or more types of modulation schemes defined by the predetermined standard". The Format signal and the NDEF signal are examples of "specific signal". The communication protocols of T1T to T5T are examples of "predetermined communication protocol". The activity layer is an example of "first communication layer", and the T1T to T5T layers are an example of "second communication layer". The state of the authentication flag 38 being "OFF" and the state of being "ON" are an example of "first operating state" and "second operating state", respectively.

S150 of FIG. 3 is an example of "receive any one signal among two or more types of signals". S210 and S220 of FIG. 4 are an example of "receive format information" and "receive a specific signal including information described in the predetermined format", respectively. S162 of FIG. 3 through S224 of FIG. 4 is an example of "execute an authentication of the target device by using first identification information".

Second Embodiment

In the present embodiment, the ID extraction process of FIG. 4 is different from that in the first embodiment. Specifically, in the case of NO in S212, and in the case of NO in S222, the process proceeds to S230. In S230, by using the response signal received in S130 or S150 of FIG. 3, the CPU 32 determines whether or not the device ID included in the received response signal is usable for authentication. Specifically, the CPU 32 performs the determination based on a table of FIG. 8.

Before describing the table of FIG. 8, the response signals complying with each communication type (see S130 or S150 of FIG. 3), and the device ID will be described with reference to FIG. 9. The response signal of type A includes an SENS (abbreviation of SENS_RES Response) signal, an SDD (abbreviation of SDD_RES Response) signal, and an SEL signal. The SDD signal includes NFCID1, which is a device ID of type A, and the SENS signal includes information indicating the data size of the NFCID. The SEL signal includes the third bit and sixth bit information described with reference to FIG. 5, and other information (e.g., seventh bit information).

The response signal of type B includes an SENSB signal, and the SENSB signal includes NFCID0, which is the device ID of type B. The response signal of type F includes an SENSF signal, and the SENSF signal includes a PAD0, and NFCID2, which is the device ID of type F. The PAD0 includes information indicating the IC type of the NFC I/F of the target device, and can also be called PMm (abbreviation of Manufacture Parameter). The response signal of type V includes an Inventory signal, and the Inventory signal includes UID (abbreviation of Universal ID), which is the device ID of type V.

As described above, the device ID is an ID having a different name for each communication type. That is, the device IDs corresponding to the communication types A, B, F, V are "NFCID1", "NFCID0", "NFCID2", and "UID", respectively. NFCID0 to 2 are regulated by the NFC forum, and the UID is not regulated by the NFC forum.

In the case where the target device is the authentication card 50, the device ID is pre-assigned to each card. In a case where the target device is the authentication card 50 corresponding to type A, F, or V, the device ID is a unique ID for each authentication card, and the device ID does not overlap between two or more authentication cards. Consequently, the device ID of the authentication card 50 corresponding to type A, F, or V is suitable for authentication. On the other hand, in the authentication card 50 corresponding to type B, the same device ID may be assigned to a plurality of authentication cards. Therefore, the device ID of the authentication card 50 corresponding to type B is not suitable for authentication.

Further, in the case where the target device is the mobile terminal 70, the device ID is prepared by the OS software 74. For example, when the SDD signal is to be sent, the OS software 74 randomly determines a character string, and determines the character string as the device ID. Therefore, if the device ID received from the mobile terminal 70 is registered in the user table 40 (S142 of FIG. 3), the device ID received from the mobile terminal 70 thereafter is usually different from the registered device ID. Therefore, the device ID received from the mobile terminal 70 is not suitable for authentication.

The table of FIG. 8 shows the communication type specified in S132 or S152 of FIG. 3, the communication protocol specified in S200 of FIG. 4, the type of target device specified based on the communication type and the communication protocol, the method for determining whether or not the device ID is usable for authentication, and the determination result. In a case where the specified communication type is type A, and the specified communication protocol is T2T, the CPU 32 specifies that the target device is the Mifare type authentication card 50. As described above, the device ID (i.e., the NFCID1) of the authentication card corresponding to type A (i.e., the Mifare type authentication card) is suitable for authentication. In this case, the CPU 32 specifies a card type (not shown) (e.g., Mifare Mini) included in the SEL signal, and specifies the data size of the NFCID1 defined in the specification document of NFC standard for the specified card type. Then, the CPU 32 determines whether or not the data size described in the SENS signal matches the specified data size. The CPU 32 determines that the NFCID1 is usable for authentication in case of determining that the data sizes match, and determines that the NFCID1 is not usable for authentication in case of determining that the data sizes do not match.

In a case where the specified communication type is type A, and the specified communication protocol is T4T, the CPU 32 specifies that the target device is the Mifare Desfire type authentication card 50 or the mobile terminal 70. In this case, the CPU 32 first determines whether the seventh bit in the SEL signal indicates ON or indicates OFF. The seventh bit in the SEL signal indicates whether or not the target device supports NFC_DEP (abbreviation of Data Exchange Protocol defined in ISO/IEC18092). Supporting NFC_DEP means that the target device is able to establish a P2P communication link, i.e., the target device is the mobile terminal 70 capable of performing bidirectional communication. Consequently, in case of determining that the seventh bit in the SEL signal indicates ON, the CPU 32 specifies that the target device is the mobile terminal 70. In this case, the CPU 32 determines that the NFCID1 is not usable for authentication. In case of determining that the seventh bit in the SEL signal indicates OFF, the CPU 32 further determines whether the data size in the SENS signal indicates 4 bytes or 7 bytes. The Mifare Desfire type authentication card 50 and the mobile terminal 70 usually adopt a data size of 7 bytes and 4 bytes, respectively, as the NFCID1. Consequently, in case of determining that the data size indicates 4 bytes, the CPU 32 specifies that the target device is the mobile terminal 70, and determines that the NFCID1 is not usable for authentication. Further, in case of determining that the data size indicates 7 bytes, the CPU 32 specifies that the target device is the Mifare Desfire type authentication card 50, and determines that the NFCID1 is usable for authentication. Moreover, the data size determined to be the Mifare Desfire type authentication card 50 (7 bytes in the present embodiment) is set based on the data size described in Mifare specifications.

In a case where the specified communication type is type B, and the specified communication protocol is T4T, the CPU 32 determines that the NFCID0 is not usable for authentication. This is because, as described above, in a case where the communication type is type B, the NFCID0 is not suitable for authentication when the target device is either the mobile terminal 70 or the authentication card 50.

In a case where the specified communication type is type F, and the specified communication protocol is T3T, the CPU 32 determines whether or not the PAD0 in the SENSF signal indicates a predetermined type (e.g., 06h, 07h, 10h to 13h, and 14h to 1Fh). Usually, the mobile terminal 70 adopts the predetermined type as the PAD0, and the authentication card 50 usually adopts a type different from the predetermined type as the PAD0. Consequently, in a case where the PAD0 indicates the predetermined type, the CPU 32 specifies that the target device is the mobile terminal 70, and determines that the NFCID2 is not usable for authentication. Further, in a case where the PAD0 does not indicate the predetermined type, the CPU 32 specifies that the target device is the authentication card 50, and determines that the NFCID2 is usable for authentication. Moreover, the PAD0 is 2 byte information, and the information (06h, etc.) indicating IC type described in the present specification and drawings indicates a part of the information included in the PAD0.

Further, the target device corresponding to type V is not the mobile terminal 70, but the authentication card 50. Therefore, in a case where the specified communication type is type V, and the specified communication protocol is T5T, the CPU 32 specifies that the target device is the authentication card 50, and determines that the UID is usable for authentication.

In case of determining in S230 of FIG. 4 that the device ID of the target device is usable for authentication (YES in S230), in S232, the CPU 32 extracts the device ID complying with the communication type. Specifically, in a case where a response signal of type A has been received, the CPU 32 extracts the NFCID1 from the SDD signal. Further, the CPU 32 extracts the NFCID2 from the SENSF signal of type F, or the UID from the Inventory signal of type V. In this case, the CPU 32 ends the process of FIG. 4 as Normal END. On the other hand, in case of determining that the device ID of the target device is not usable for authentication (NO in S230), the CPU 32 ends the process of FIG. 4 as Error END.

(Specific Case E; FIG. 10)

Next, a case E realized by the second embodiment will be described with reference to FIG. 10. In case E, the target device is a Mifare Mini (i.e., Mifare type) authentication card 50C whose communication type corresponds to type A. An NFCID1 "A5" is pre-assigned to the authentication card 50C. Moreover, the data size of the Mifare Mini NFCID1 defined in the specification document is 4 bytes.

In T430, in response to sending of the Polling signal of type A, the MFP 10 sequentially receives, from the authentication card 50C, response signals of type A including an SENS signal, an SDD signal including the NFCID1 "A5", and an SEL signal (YES in S150 of FIG. 3). In this case, the MFP 10 specifies type A (S152).

Since the third bit in the SEL signal indicates OFF, and the sixth bit indicates OFF, the MFP 10 determines that the target device supports T2T (see FIG. 5, YES in S200 of FIG. 4) and, in T440, performs a T2T communication with the target device, and receives a Format signal from the authentication card 50C. Since the Format information indicates that the authentication card 50C does not support NDEF (NO in S212), the MFP 10 determines whether or not the NFCID1 included in the received SDD signal is usable for authentication (S230). Specifically, since the specified communication type is type A, and the specified communication protocol is T2T, the MFP 10 specifies that the target device is the Mifare type authentication card. In particular, based on the information indicating card type in the SEL signal, the MFP 10 determines that the target device is the Mifare Mini authentication card 50C. Then, since the data size information in the SENS signal indicates 4 bytes, the MFP 10 determines that the data size in the SENS signal matches the data size of the Mifare Mini defined in the specification, and determines that the NFCID1 included in the SDD signal is usable for authentication (YES in S230).

In T450, the MFP 10 extracts the NFCID1 "A5" from the SDD signal (S232). In T452, the MFP 10 authenticates the authentication card 50C by using the NFCID1 "A5" (S162 of FIG. 3).

Effect of Second Embodiment

According to the present embodiment, in the case where the target device does not support NDEF (NO in S212 of FIG. 4), or in the case where the authentication application 78 is not installed on the target device (NO in S222), the MFP 10 can authenticate the target device by using the device ID different from the generation ID (S232, S162 of FIG. 3). In particular, the MFP 10 determines whether or not the device ID is usable for authentication (S230), and authenticates the target device by using the device ID which is determined as usable. Therefore, the MFP 10 can appropriately perform authentication of the target device by using the device ID. That is, the MFP 10 can appropriately perform authentication of the target device by using the generation ID or the device ID.

(Correspondence Relationship)

The device ID is an example of "identification information different from the first identification information" and "second identification information". S230 of FIG. 4 is an example of "determine whether or not the second identification information is usable for the authentication". S162 of FIG. 3 through S232 of FIG. 4 is an example of "execute an authentication of the target device by using identification information different from the first identification information".

Third Embodiment

In the present embodiment, the ID extraction process of FIG. 4 is different from that in the second embodiment. Specifically, in the case of NO in S212 or the case of NO in S222, the process proceeds to S240. In S240, the CPU 32 performs an upper layer communication (e.g., T4T communication) using the communication protocol specified in S200, sending a request signal to the target device, and receiving a non-dependent signal not depending on NDEF from the target device. The non-dependent signal includes data written in the memory in the NFC I/F of the target device.

In S242, the CPU 32 determines whether or not an identification ID is included in the non-dependent signal. In the present embodiment, the program 36 includes a program corresponding to a rule for describing the identification ID in the authentication card 50 of type B. The rule is a rule determined by the vendor of the authentication card 50 of type B, and defines that the identification ID of a predetermined size is described at a predetermined position of the non-dependent signal. Further, the identification ID is a unique ID assigned to each authentication card 50 by the vendor of the authentication card 50 of type B. Therefore, the identification ID is suitable for authentication. In S242, the CPU 32 determines whether or not the identification ID is included in the non-dependent signal by determining whether or not the identification ID of the predetermined size is described at the predetermined position of the non-dependent signal.

In case of determining that the identification ID is included in the non-dependent signal (YES in S242), in S244, the CPU 32 extracts the identification ID in the non-dependent signal. In this case, the CPU 32 ends the process of FIG. 4 as Normal END. As a result, YES is determined in S140 or S160 of FIG. 3, and the extracted identification ID is used in S142 or S162. On the other hand, in case of determining that the identification ID is not included in the non-dependent signal (NO in S242), the CPU 32 proceeds to S230. Moreover, in a modification, in the case of NO in S242 the process may be ended as error END without proceeding to S230 and, in this case, in the case of NO in S212 or S222, also, the process may be ended as Error END without proceeding to S230.

Moreover, in a modification, instead of, or in addition to, the rule for the authentication card 50 of type B, the program 36 may include a program corresponding to a rule for another type of authentication card 50 or for the mobile terminal 70. In this case, the CPU 32 performs the determination of S242 by using the rule according to the program 36.

(Specific Case F; FIG. 10)

Next, a case F realized by the third embodiment will be described with reference to FIG. 10. In case F, the target device is an authentication card 50D whose communication type corresponds to type B. An NFCID0 "A6" and an identification ID "A7" different from the NFCID0 are pre-assigned to the authentication card 50D.

In T530, in response to sending of a Polling signal of type B, the MFP 10 receives a response signal of type B including an SENSB signal from the authentication card 50D (YES in S130). Then, in T540, the MFP 10 performs a T4T communication with the target device to receive a Format signal including Format information from the authentication card 50D. Since the Format information indicates that the authentication card 50D does not support NDEF (NO in S212), the MFP 10 further receives a non-dependent signal from the authentication card 50D (S240). Since the identification ID "A7" is included in the non-dependent signal (YES in S242), in T550, the MFP 10 extracts the identification ID "A7" (S244) and, in T552, authenticates the authentication card 50D by using the extracted identification ID "A7". Here, the MFP 10 does not perform authentication by using the NFDID0 included in the SENSB signal. As described above, that is because the NFDID0 corresponding to type B is not suitable for authentication.

Effect of Third Embodiment

According to the present embodiment, in the case where the target device does not support NDEF (NO in S212 of FIG. 4), the MFP 10 can authenticate the target device by using the identification ID different from the generation ID, i.e., the identification ID included in the non-dependent signal not depending on NDEF (S244 of FIG. 4, S162 of FIG. 3). That is, the MFP 10 can appropriately perform authentication of the target device by using the generation ID, the device ID, or the identification ID.

(Correspondence Relationship)

The identification ID is an example of "identification information different from the first identification information" and "third identification information". S162 of FIG. 3 through S232 or S244 of FIG. 4 is an example of "execute an authentication of the target device by using identification information different from the first identification information".

(Modification 1) In case of determining YES in S110 of FIG. 3, the CPU 32 may change the mode state of the NFC I/F 22 to a mode state in which P2P mode, R/W mode, and CE mode are all ON. In this state, the CPU 32 can perform the print function, as in FIG. 2. Further, in case of determining YES in S120, the CPU 32 may change the mode state of the NFC I/F 22 to a mode state in which P2P mode and CE mode are OFF, and R/W mode is ON. In this case, the CPU 32 can appropriately perform the process for extracting the ID from the target device and registering the ID (S130 to S142). In the present modification, also, the state of the authentication flag 38 being "OFF", and the state of the authentication flag 38 being "ON" are an example of "first operating state" and "second operating state", respectively. In another viewpoint, a state in which the registration button has not been operated after the login operation, and a state in which the registration button has been operated are "first operating state" and "second operating state", respectively. Further, in another modification, the mode state of the NFC I/F 22 may be fixed to a mode state in which at least R/W mode is ON. That is, "set a mode state of the wireless interface" can be omitted.

(Modification 2) The MFP 10 may not have the authentication flag 38. In this case, the CPU 32 does not perform the process of FIG. 2. That is, "send wireless setting information to the target device via the wireless interface" can be omitted.

(Modification 3) In an environment where any of the target devices supports any of the communication protocols of T1T to T5T, S200 of FIG. 4 may be omitted, and the steps from S210 onward may be performed. That is, "determine whether or not the target device supports a predetermined communication protocol" can be omitted.

(Modification 4) The mobile terminal 70 may write the vendor information and the generation ID to the authentication card 50 by using the authentication application 78. In this case, when the user brings the authentication card 50 close to the MFP 10, the CPU 32 performs the processes of S200 to S224 of FIG. 4, extracting the generation ID written to the authentication card 50. Thus, the target device from which the generation ID is extracted is not restricted to the mobile terminal 70, but may be the authentication card 50.

(Modification 5) The CPU 32 may receive the user information (the user name and the password) instead of the generation ID in S220 of FIG. 4. For example, when the user activates the authentication application 78, a screen on which the user information can be input is displayed on the mobile terminal 70. When the user inputs the user information registered in the user table 40, the mobile terminal 70 stores the inputted user information. When the user brings the mobile terminal 70 close to the MFP 10 and the NFC communication has been established between the MFP 10 and the mobile terminal 70, in S220 the CPU 32 receives the NDEF signal including the user information from the mobile terminal 70. In this case, in S224, the CPU 32 extracts the user information from the NDEF signal and determines that authentication has succeeded in a case where that user information and the user information registered in the user table 40 match. In the present modification, the CPU 32 does not need to perform registration of the authentication ID. Consequently, the processes of S120, and S130 to S144 of FIG. 3 can be omitted.

(Modification 6) Registration of the authentication ID in the user table 40 may be performed by the administrator operating the operation unit 12. In this case, S120, and S130 to S144 of FIG. 3 can be omitted.

(Modification 7) In S10 of FIG. 2, the CPU 32 may set the mode state of the NFC I/F 22 to a mode state in which only CE mode is ON. In this case, in S12, the CPU 32 monitors whether a CE-R/W communication link is established in which the NFC I/F 22 operates in CE mode and the NFC I/F 72 operates in R/W mode. The processes of S14 to S24 are the same as the embodiment described above. However, as a result of S16, the NFC I/F 22 sends the wireless setting to the mobile terminal 70 via the CE-R/W communication link. Generally speaking, "first mode state" may be any state in which at least one of P2P mode and CE mode is active.

(Modification 8) The user table 40 may store shortcut information indicating a shortcut function. The shortcut information may be information indicating, e.g., scan setting, scan data destination, etc. In this case, in a case where authentication of the target device has succeeded (S162), the CPU 32 performs a scan according to the scan settings included in the shortcut information corresponding to the authentication ID for which authentication has succeeded, and then sends scan data to the destination included in the shortcut information.

(Modification 9) "Wireless interface" may not be an I/F for performing NFC communication, but may be an I/F for performing a wireless communication complying with another communication system, e.g., BlueTooth (registered trademark), TransferJet (registered trademark), etc.

(Modification 10) "Communication device" may not be the MFP 10 that is capable of performing a plurality of functions, but may be a printing device capable of performing only the print function, or a scanner device capable of performing only the scan function.

(Modification 11) In the above embodiment, each process of FIG. 2 to FIG. 4 is implemented by the CPU 32 of the MFP 10 performing the program 36 (i.e., software). Instead, at least one process of the processes FIG. 2 to FIG. 4 may be implemented by hardware such as a logic circuit.

What is claimed is:

1. A communication device comprising:
    a wireless interface configured to perform a wireless communication according to a near field communication (NFC) standard;
    a processor; and
    a memory storing computer-readable instructions therein, the computer-readable instructions, when executed by the processor, causing the communication device to:
    receive a first signal among two or more types of signals according to two or more types of modulation schemes defined by the NFC standard from a first target device via the wireless interface, the first signal being according to a first modulation scheme of the two or more types of modulation schemes;
    receive first format information from the first target device via the wireless interface after the first signal is received from the first target device via the wireless interface, the first format information including information indicating whether or not the first target device supports a NFC data exchange format (NDEF) defined by the NFC standard, the NDEF being for describing information in a signal;

receive, after the first format information is received, a first NDEF signal including information described in the NDEF from the first target device via the wireless interface in a case where the first format information indicates that the first target device supports the NDEF, wherein the first NDEF signal is not received in a case where the first format information indicates that the first target device does not support the NDEF;

determine whether or not related information related to a predetermined application software is included in the first NDEF signal;

execute an authentication of the first target device by using first identification information included in the first NDEF signal in a case where it is determined that the related information is included in the first NDEF signal, wherein the authentication of the first target device by using information included in the first NDEF signal is not executed in a case where it is determined that the related information is not included in the first NDEF signal receive a second signal among the two or more types of signals from a second target device via the wireless interface, the second signal being according to a second modulation scheme of the two or more types of modulation schemes, the second signal being different from the first signal, the second target device being different from the first target device, and the second modulation scheme being different from the first modulation scheme;

receive second format information from the second target device via the wireless interface after the second signal is received from the second target device via the wireless interface, the second format information including information indicating whether or not the second target device supports the NDEF;

receive, after the second format information is received, a second NDEF signal including information described in the NDEF from the second target device via the wireless interface in a case where the second format information indicates that the second target device supports the NDEF, wherein the second NDEF signal is not received in a case where the second format information indicates that the second target device does not support the NDEF;

determine whether or not the related information is included in the second NDEF signal; and execute an authentication of the second target device by using target identification information included in the second NDEF signal in a case where it is determined that the related information is included in the second NDEF signal, wherein the authentication of the second target device by using information included in the second NDEF signal is not executed in a case where it is determined that the related information is not included in the second NDEF signal.

2. The communication device as in claim 1, wherein the computer-readable instructions, when executed by the processor, further cause the communication device to:

execute an authentication of the first target device by using identification information different from the first identification information in the case where the first format information indicates that the first target device does not support the NDEF.

3. The communication device as in claim 2, wherein the authentication of the first target device is executed by using second identification information different from the first identification information in the case where the first format information indicates that the first target device does not support the NDEF, the second identification information being included in the received first signal.

4. The communication device as in claim 3, wherein the computer-readable instructions, when executed by the processor, further cause the communication device to:

determine whether or not the second identification information is usable for the authentication of the first target device by using the received first signal, wherein the authentication of the first target device by using the second identification information is executed in a case where it is determined that the second identification information is usable for the authentication, and the authentication of the first target device by using the second identification information is not executed in a case where it is determined that the second identification information is not usable for the authentication.

5. The communication device as in claim 2, wherein the computer-readable instructions, when executed by the processor, further cause the communication device to:

receive a non-dependent signal not depending on the NDEF from the first target device via the wireless interface in the case where the first format information indicates that the first target device does not support the NDEF, wherein the authentication of the first target device by using third identification information different from the first identification information is executed in a case where the non-dependent signal includes the third identification information.

6. The communication device as in claim 1, wherein the computer-readable instructions, when executed by the processor, further cause the communication device to:

determine whether or not the first target device supports a predetermined communication protocol defined by the NFC standard by using the received first signal, wherein the first format information is received from the first target device in a case where it is determined that the first target device supports the predetermined communication protocol, and the first format information is not received in a case where it is determined that the first target device does not support the predetermined communication protocol.

7. The communication device as in claim 1, wherein the first signal and the second signal are received by using a first communication layer defined by the NFC standard without using a second communication layer defined by the NFC standard, the second communication layer being higher than the first communication layer, the first format information and the second format information are received by using the second communication layer, and the first NDEF signal and the second NDEF signal are received by using the second communication layer.

8. The communication device as in claim 1, wherein in a case where the first signal is received from the first target device while the communication device is set in a first operation mode:

the first format information is received;

the first NDEF signal is received from the first target device in the case where the first format information indicates that the first target device supports the NDEF;

the determination of whether or not the related information is included in the first NDEF signal is executed; and the authentication of the first target device by using the first identification information is executed in the case where it is determined that the related information is included in the first NDEF signal, wherein the computer-readable instructions, when executed by the processor, further cause the communication device to:

send wireless setting information to the first target device via the wireless interface in a case where the first signal is received while the communication device is set in a second operation mode different from the first operation mode, wherein the wireless setting information is for establishing a wireless connection between the communication device and the first target device via an interface different from the wireless interface.

9. The communication device as in claim 8, wherein the computer-readable instructions, when executed by the processor, further cause the communication device to:

set a mode state of the wireless interface to a first mode state in a case where the operation mode of the communication device is changed from the second operation mode to the first operation mode, the first mode state being a state where at least one of P2P (abbreviation of Peer to Peer) mode and CE (abbreviation of Card Emulation) mode of the NFC standard is active; and set the mode state of the wireless interface to a second mode state in a case where the operation mode of the communication device is changed from the first operation mode to the second operation mode, the second mode state being a state where the P2P mode and the CE mode of the NFC standard are inactive and R/W (abbreviation of Reader/Writer) mode of the NFC standard is active.

10. A non-transitory computer-readable recording medium storing computer-readable instructions for a communication device, wherein the computer-readable instructions, when executed by a processor of the communication device, causing the communication device to:

receive a first signal among two or more types of signals according to two or more types of modulation schemes defined by a near field communication (NFC) standard from a first target device via a wireless interface of the communication device, the wireless interface being configured to perform a wireless communication according to the NFC standard, the first signal being according to a first modulation scheme of the two or more types of modulation schemes;

receive first format information from the first target device via the wireless interface after the first signal is received from the first target device via the wireless interface, the first format information including information indicating whether or not the first target device supports a NFC data exchange format (NDEF) defined by the NFC standard, the NDEF being for describing information in a signal;

receive, after the first format information is received, a first NDEF signal including information described in the NDEF from the first target device via the wireless interface in a case where the first format information indicates that the first target device supports the NDEF, wherein the first NDEF signal is not received in a case where the first format information indicates that the first target device does not support the NDEF;

determine whether or not related information related to a predetermined application software is included in the first NDEF signal;

execute an authentication of the first target device by using first identification information included in the first NDEF signal in a case where it is determined that the related information is included in the first NDEF signal, wherein the authentication of the first target device by using information included in the first NDEF signal is not executed in a case where it is determined that the related information is not included in the first NDEF signal;

receive a second signal among the two or more types of signals from a second target device via the wireless interface, the second signal being according to a second modulation scheme of the two or more types of modulation schemes, the second signal being different from the first signal, the second target device being different from the first target device, and the second modulation scheme being different from the first modulation scheme;

receive second format information from the second target device via the wireless interface after the second signal is received from the second target device via the wireless interface, the second format information including information indicating whether or not the second target device supports the NDEF;

receive, after the second format information is received, a second NDEF signal including information described in the NDEF from the second target device via the wireless interface in a case where the second format information indicates that the second target device supports the NDEF, wherein the second NDEF signal is not received in a case where the second format information indicates that the second target device does not support the NDEF;

determine whether or not the related information is included in the second NDEF signal; and execute an authentication of the second target device by using target identification information included in the second NDEF signal in a case where it is determined that the related information is included in the second NDEF signal, wherein the authentication of the second target device by using information included in the second NDEF signal is not executed in a case where it is determined that the related information is not included in the second NDEF signal.

11. A method performed by a communication device, the method comprising;

receiving a first signal among two or more types of signals according to two or more types of modulation schemes defined by a near field communication (NFC) standard from a first target device via a wireless interface of the communication device, the wireless interface being configured to perform a wireless communication according to the NFC standard, the first signal being according to a first modulation scheme of the two or more types of modulation schemes;

receiving first format information from the first target device via the wireless interface after the first signal is received from the first target device via the wireless interface, the first format information including information indicating whether or not the first target device supports a NFC data exchange format (NDEF) defined by the NFC standard, the NDEF being for describing information in a signal;

receiving, after the first format information is received, a first NDEF signal including information described in the NDEF from the first target device via the wireless interface in a case where the first format information indicates that the first target device supports the NDEF, wherein the first NDEF signal is not received in a case where the first format information indicates that the first target device does not support the NDEF;

determining whether or not related information related to a predetermined application software is included in the first NDEF signal;

executing an authentication of the first target device by using first identification information included in the first NDEF signal in a case where it is determined that the related information is included in the first NDEF signal, wherein the authentication of the first target device by using information included in the first NDEF signal is not executed in a case where it is determined that the related information is not included in the first NDEF signal;

receiving a second signal among the two or more types of signals from a second target device via the wireless interface, the second signal being according to a second modulation scheme of the two or more types of modulation schemes, the second signal being different from the first signal, the second target device being different from the first target device, and the second modulation scheme being different from the first modulation scheme;

receiving second format information from the second target device via the wireless interface after the second signal is received from the second target device via the wireless interface, the second format information including information indicating whether or not the second target device supports the NDEF;

receiving, after the second format information is received, a second NDEF signal including information described in the NDEF from the second target device via the wireless interface in a case where the second format information indicates that the second target device supports the NDEF, wherein the second NDEF signal is not received in a case where the second format information indicates that the second target device does not support the NDEF;

determining whether or not the related information is included in the second NDEF signal; and executing an authentication of the second target device by using target identification information included in the second NDEF signal in a case where it is determined that the related information is included in the second NDEF signal, wherein the authentication of the second target device by using information included in the second NDEF signal is not executed in a case where it is determined that the related information is not included in the second NDEF signal.

* * * * *